UNITED STATES PATENT OFFICE.

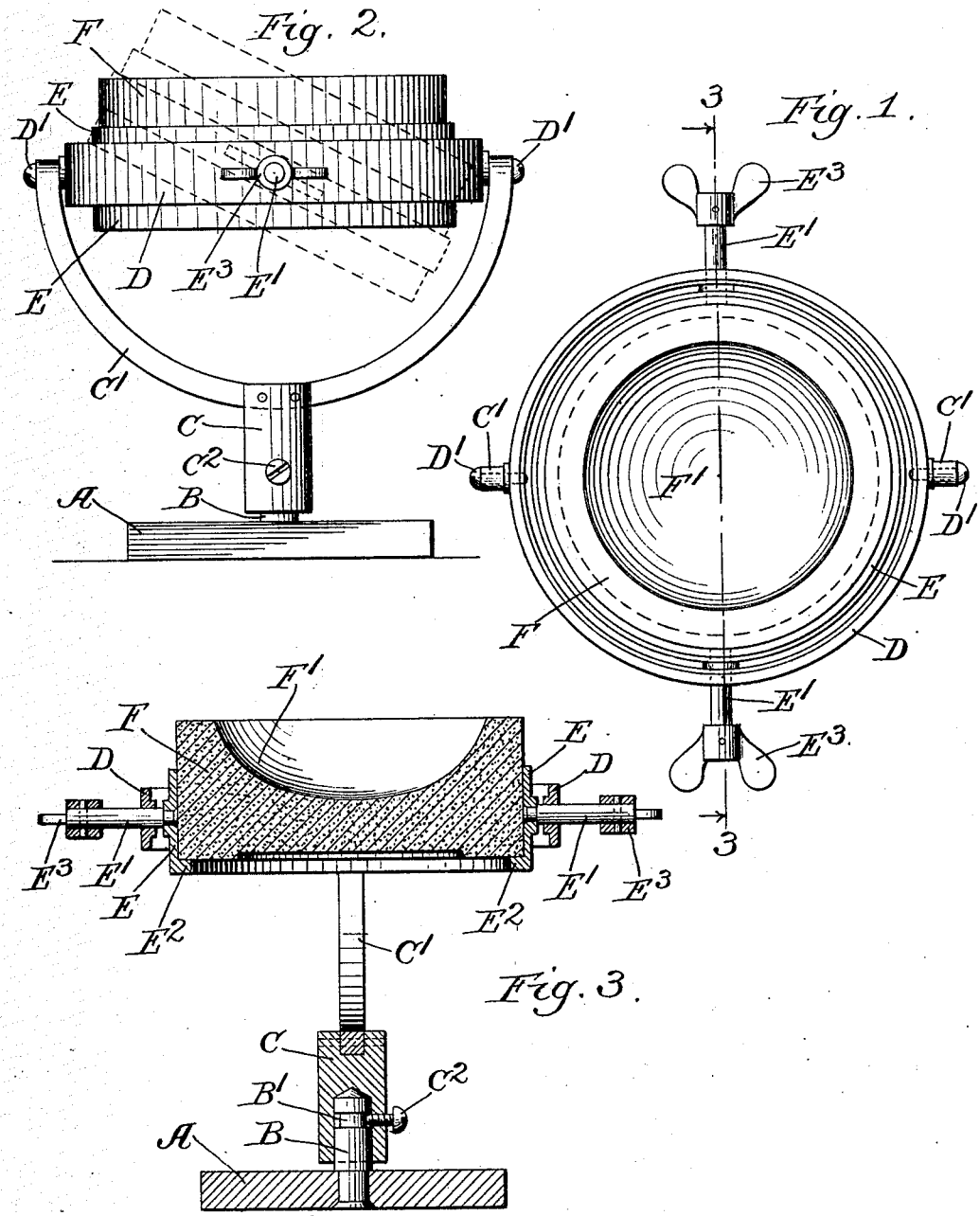

HARDY F. POOL, OF MASON CITY, IOWA.

SOLDERING DEVICE.

No. 860,569.　　　Specification of Letters Patent.　　　Patented July 16, 1907.

Application filed June 21, 1906. Serial No. 322,695.

*To all whom it may concern:*

Be it known that I, HARDY F. POOL, a citizen of the United States, residing at Mason City, in the county of Cerro Gordo and State of Iowa, have invented a certain new and useful Improvement in Soldering Devices, of which the following is a specification.

My invention relates to soldering apparatus and has for its object to provide new and improved constructions in devices of that character.

The apparatus is suitable for dentistry or jewelry work where the heat is to be applied, for example, by means of the flame of a blow pipe and where it is necessary to heat the article on all sides including applying the flame directly to the top of the article. In work of this character the operator needs to have his hands as free as possible for manipulation of the work and still at the same time must have the thing he is working upon supported in such a way that it may be readily turned or inclined at any angle. An arrangement of this sort is particularly advantageous in soldering as the flow of the solder in the right direction may be controlled by proper manipulation of the device.

The invention is illustrated in the accompanying drawings, wherein

Figure 1 is a plan view, Fig. 2 is a side elevation, Fig. 3 is a vertical section on line 3—3 of Fig. 1.

Like letters of reference indicate like parts in all the drawings.

In the drawings, A represents the base which may consist of a plate or block of metal or the like having centrally thereon the pivot B on which is mounted the cap piece C of a yoke $C^1$. The parts may be properly held together by the screw $C^2$ which takes into a slot $B^1$ in the pivot B. Mounted on the yoke $C^1$ is an outer ring, as I shall call it, D, this ring being connected with the yoke by the pivots $D^1$ $D^1$ so as to be capable of inclination at any desired angle. Within this ring is an inner ring E connected with the outer ring by the pivot pins $E^1$ $E^1$ which stand at ninety degrees from the pivots $D^1$ $D^1$. The inner ring can, therefore, be tilted at any angle with respect to the outer. The inner ring has preferably the internal flange $E^2$ to give support to the soldering block F which preferably fits snugly within this ring. The soldering block is preferably made of asbestos or some other such non-combustible material and may be recessed as shown at $F^1$. In order to conveniently tilt the inner ring, I provide handles or finger pieces $E^3$ $E^3$ which I have shown as continuations of the pivot pins $E^1$, these being rigidly attached to the inner ring and turning loosely in the outer.

I wish it to be understood that I do not desire to be limited to the exact details of construction shown and described for obvious modifications will occur to any person skilled in the art.

I have termed this device a soldering apparatus, but it will be obvious that it might be put to other uses than soldering strictly speaking, and I, therefore, do not wish the term to be understood in its narrow sense.

The use and operation of my device are as follows: The device is intended to facilitate the soldering of all forms of hard soldering on small articles and especially to facilitate the soldering of the several parts of a substitute for a tooth or teeth, such work being taken of course for purposes of illustration. In work of this character, it is usual to prepare suitable metal parts to which are to be attached suitable porcelain parts by the means of solder. The metal portion being properly prepared, we then select a suitable porcelain part or parts, which are to be attached by solder to such metal portions. These parts are put together in proper relations, temporarily, for example, by wax. They are then inclosed in what is called an investment, which serves to hold them in their proper relation, and, at the same time, is capable of transmitting heat freely to the inclosed parts. The wax or temporary binding is now removed, leaving the cavity whence it is removed. The investment containing the associated parts is now laid in proper position in or on the soldering block, or other container, and the solder with the flux is placed in or on such cavity in proper position. Heat is now to be applied for the purpose of soldering the parts together. Now since the porcelain part has in its construction a piece or pieces of platinum baked into the porcelain and extending beyond the porcelain as far, or farther, as it, or they extend into the porcelain to which we attach this or other metal, by means of solder it is absolutely necessary that the porcelain be heated to a point where it is thoroughly expanded before the platinum (which is a part of the porcelain part) expands. If the platinum be expanded before the porcelain expands, it will check or break the porcelain from it. This makes it necessary to apply the flame to the investment from practically every direction, and my apparatus greatly facilitates such action by the revolving and tilting action of the device. When it has been sufficiently heated in this manner, the solder will itself fill up the cavities and complete the work, though the flame can be directed against the solder if desired. Any and all of these actions can be carried out by revolving or tilting the several parts of my device. Gravity will carry the molten solder in any direction by tilting one or the other of the rings at the proper inclination. It will be seen that the necessary inclination or change of position may be rapidly effected by the operator, the block retaining its position after being moved so as to permit the operator to use both of his hands, if necessary upon the work.

I claim:

1. In soldering apparatus, the combination of a stationary base, a holding device for holding the material operated upon, and means comprising pivoted rings for mounting said holding device on the base so that it will be capable of rotation and of inclination at any desired angle.

2. In soldering apparatus, the combination of a stationary base, an asbestos soldering block for holding the material operated upon, and means comprising pivoted rings for mounting said block on the base so that it will be capable of rotation and of inclination at any desired angle.

3. In soldering apparatus, the combination of a base with a soldering block and a device for supporting the block on the base comprising a yoke connected with the base, a ring pivoted to the yoke, and means for mounting the block upon the ring.

4. In soldering apparatus, the combination of a base with a soldering block and a device for supporting the block on the base comprising a yoke pivoted to the base, a ring pivoted to the yoke, and means for mounting the block upon the ring.

5. In soldering apparatus, the combination of a base, with a soldering block and a device for supporting the block on the base comprising a yoke connected with the base, an outer ring pivoted to the yoke, and an inner ring supporting the block and pivotally mounted in the outer ring.

6. In soldering apparatus, the combination of a base with a soldering block and a device for supporting the block on the base comprising a yoke connected with the base, an outer ring pivoted to the yoke, an inner ring supporting the block and pivotally mounted in the outer ring, and finger pieces connected with said inner ring.

7. In soldering apparatus, the combination of a base with a yoke pivoted on the base, an outer ring pivotally mounted on the yoke, an inner ring pivotally mounted on the outer ring at points ninety degrees distant from the connection between the outer ring and the yoke, and a soldering block supported within the inner ring.

8. In soldering apparatus, the combination of a base, with a yoke pivoted on the base, an outer ring pivotally mounted on the yoke, an inner ring pivotally mounted on the outer ring at points ninety degrees distant from the connection between the outer ring and the yoke, said inner ring having an internal flange, a recessed soldering block supported within the inner ring, and finger pieces on the inner ring by means of which it may be tilted.

HARDY F. POOL.

Witnesses:
ABBIE E. JOHNSON,
SOPHIE B. WERNER.